(12) United States Patent
Wang et al.

(10) Patent No.: US 12,481,678 B1
(45) Date of Patent: Nov. 25, 2025

(54) MULTI-OS LOG MANAGEMENT METHOD AND USER EQUIPMENT THEREOF

(71) Applicant: MediaTek Singapore Pte. Ltd., Singapore (SG)

(72) Inventors: Chunlei Wang, Beijing (CN); Huadian Liu, Beijing (CN); Zhiyong Wang, Beijing (CN); Huichao Ma, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 18/771,249

(22) Filed: Jul. 12, 2024

(51) Int. Cl.
*G06F 7/00* (2006.01)
*G06F 16/28* (2019.01)

(52) U.S. Cl.
CPC .................... *G06F 16/285* (2019.01)

(58) Field of Classification Search
CPC ...................................................... G06F 16/285
USPC .................................................. 707/600–899
See application file for complete search history.

(56) References Cited

U.S. PATENT DOCUMENTS

2023/0063167 A1* 3/2023 Konan .................. G06F 9/4403

* cited by examiner

*Primary Examiner* — Isaac M Woo
(74) *Attorney, Agent, or Firm* — McClure, Qualey & Rodack, LLP

(57) ABSTRACT

A multi-operating system (OS) log management method is provided. The multi-OS log management method may include the following steps. The apparatus may store the log data from each sub-OS of the apparatus in a memory buffer of the apparatus through a universal asynchronous receiver transmitter (UART) circuit or each sub-OS of the apparatus. Then, the apparatus may manage the log data.

20 Claims, 5 Drawing Sheets

MULTI-OS LOG MANAGEMENT METHOD AND USER EQUIPMENT THEREOF

BACKGROUND OF THE INVENTION

Field of the Invention

The invention generally relates to mobile communications, and more particularly, to a multi-operating system (OS) log management technology with respect to user equipment (UE).

Description of the Related Art

As science and technology continue to progress, the operation of communication apparatuses has become more complex. There are more sub-operating systems that can be operated in a communication apparatus. Examples include a trusted execution environment (TEE), a modem (MD), a multimedia (MM), an application processing unit (APU), an ARM trusted firmware (TFA), a sensor-hub control processor (SCP), a graphics processing unit (GPU), a connectivity system (CONSYS), boot random-only memory (BROM), a preloader, and a litter kernel (LK).

In conventional technology, each sub-OS has its own specific debug log mechanism. That is, each sub-OS needs a specific data buffer to store its log data. In addition, each sub-OS needs a specific driver in the kernel to process its log data (e.g., write or read log data). Therefore, the operations for maintaining or managing the log data from different sub-OSes in the communication apparatus may be very complex.

Therefore, how to manage log data from different sub-OSs more simply and efficiently in a communication apparatus is a topic that is worthy of discussion.

BRIEF SUMMARY OF THE INVENTION

A multi-operating system (OS) log management method and user equipment (UE) are provided to overcome the problems mentioned above.

An embodiment of the invention provides a multi-OS log management method. The multi-OS log management method may include the following steps. The apparatus may store the log data from each sub-OS of the apparatus in a memory buffer of the apparatus through a universal asynchronous receiver transmitter (UART) circuit or each sub-OS of the apparatus. Then, the apparatus may manage the log data.

In some embodiments, each log data of different sub-OSes comprises a specific header.

In some embodiments, the apparatus may use a direct memory access (DMA) technology to store the log data from each sub-OS in the memory buffer.

In some embodiments, the UART circuit of the apparatus may encrypt the log data before the log data is stored in the memory buffer.

In some embodiments, the UART circuit of the apparatus may output the log data through a UART port.

In some embodiments, the UART circuit of the apparatus may output the log data through a universal serial bus (USB) port.

In some embodiments, the apparatus may classify the log data according to timestamps of the log data, and store the classified log data into a memory of the apparatus.

In some embodiments, the apparatus may classify the log data according to events corresponding to the log data, and store the classified log data into a memory of the apparatus.

In some embodiments, the apparatus may combine the log data corresponding to the same event, and store the combined log data into a memory of the apparatus.

In some embodiments, the apparatus may compress the log data, and store the compressed log data into a memory of the apparatus.

An embodiment of the invention provides a user equipment (UE) for cell switching. The UE may comprise a UART circuit, a memory and a processor. The memory may comprise a memory buffer for log data. The processor may be coupled to the UART circuit and the memory. The processor may perform a plurality of sub-operating systems (OSs). During operation, the processor may perform operations of storing log data from each sub-OS in the memory buffer through the UART circuit or each sub-OS of the apparatus, and managing the log data.

Other aspects and features of the invention will become apparent to those with ordinary skill in the art upon review of the following descriptions of specific embodiments of the method and UE for cell switching.

BRIEF DESCRIPTION OF THE DRA WINGS

The invention will become more fully understood by referring to the following detailed description with reference to the accompanying drawings, wherein.

DETAILED DESCRIPTION OF THE DISCLOSURE

The following description is of the best-contemplated mode of carrying out the invention. This description is made for the purpose of illustrating the general principles of the invention and should not be taken in a limiting sense. The scope of the invention is best determined by reference to the appended claims.

Figure 1:
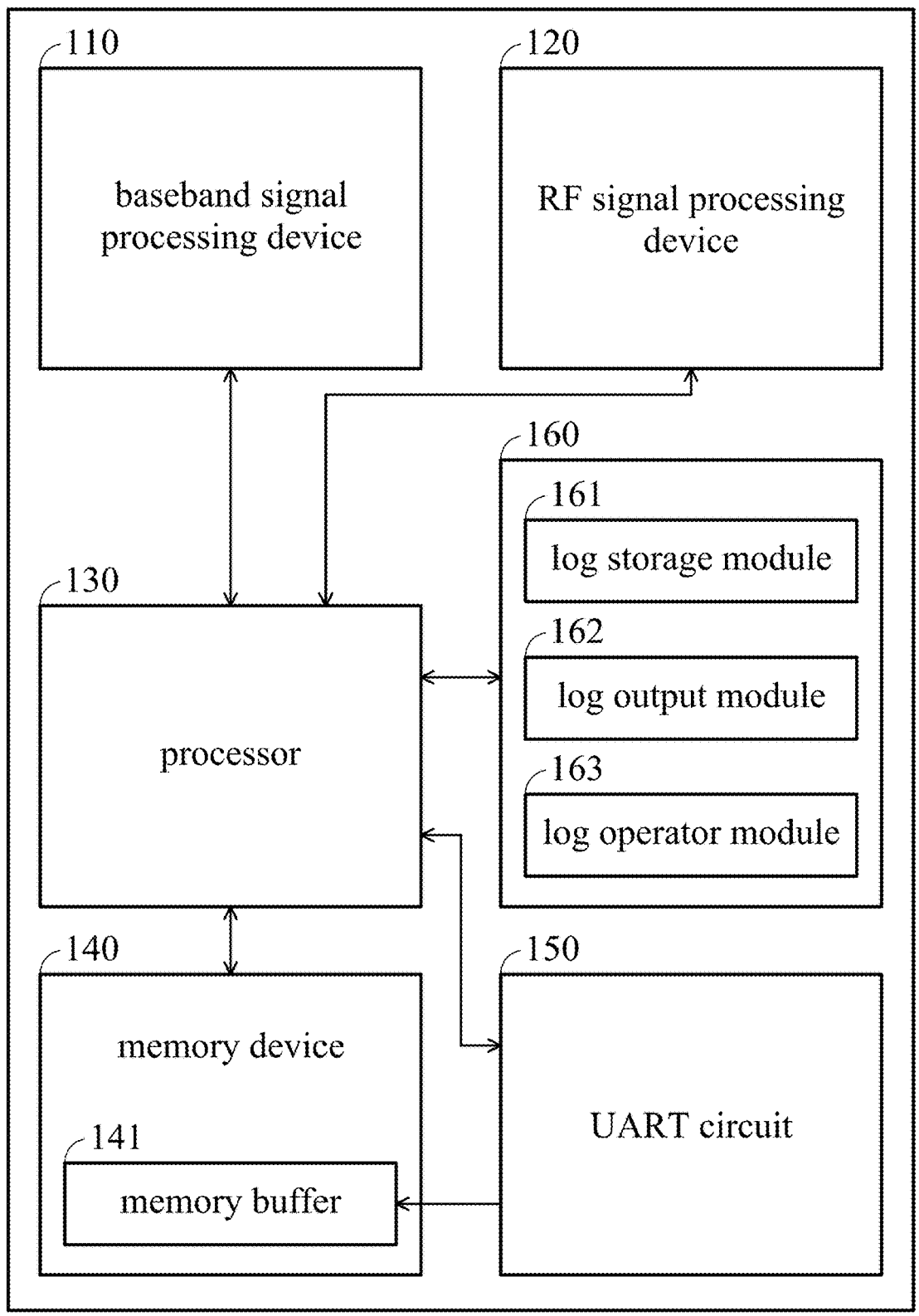
FIG. 1 is a block diagram of a multi-operating system (OA) log management apparatus 100 according to an embodiment of the invention.

FIG. 1 is a block diagram of a multi-operating system (OA) log management apparatus 100 according to an embodiment of the invention. As shown in FIG. 1, the multi-OS log management apparatus 100 may at least comprise a baseband signal processing device 110, a radio frequency (RF) signal processing device 120, a processor 130, a memory device 140, a universal asynchronous receiver transmitter (UART) circuit 150, and function modules and circuits 160. It should be noted that in order to clarify the concept of the invention, FIG. 1 presents a simplified block diagram in which only the elements relevant to the invention are shown. However, the invention should not be limited to what is shown in FIG. 1.

In the embodiments of the invention, the multi-OS log management apparatus 100 may be a user equipment (UE), a smartphone, Personal Data Assistant (PDA), pager, laptop computer, desktop computer, wireless handset, or any computing device that includes a wireless communications interface.

The RF signal processing device 120 may be a transceiver. The RF signal processing device 120 may comprise a plurality of antennas to receive or transmit RF signals. The RF signal processing device 120 may receive RF signals via the antennas and process the received RF signals to convert the received RF signals to baseband signals to be processed by the baseband signal processing device 110, or receive baseband signals from the baseband signal processing device 110 and convert the received baseband signals to RF signals to be transmitted to a peer communications apparatus. The RF signal processing device 120 may comprise a plurality of hardware elements to perform radio frequency conversion. For example, the RF signal processing device 120 may comprise a power amplifier, a mixer, analog-to-digital converter (ADC)/digital-to-analog converter (DAC), etc.

The baseband signal processing device 110 may further process the baseband signals to obtain information or data transmitted by the peer communications apparatus. The baseband signal processing device 110 may also comprise a plurality of hardware elements to perform baseband signal processing.

According to an embodiment of the invention, the RF signal processing device 120 and the baseband signal processing device 110 may collectively be regarded as a radio module capable of communicating with a wireless network to provide wireless communications services in compliance with a predetermined Radio Access Technology (RAT). Note that, in some embodiments of the invention, the multi-OS log management apparatus 100 may be extended further to comprise more than one antenna and/or more than one radio module, and the invention should not be limited to what is shown in FIG. 1.

The processor 130 may control the operations of the baseband signal processing device 110, the RF signal processing device 120, the memory device 140, the UART circuit 150 and the function modules and circuits 160. According to an embodiment of the invention, the processor 130 may also be arranged to execute the program codes of the software modules of the corresponding baseband signal processing device 110, the RF signal processing device 120, UART circuit 150 and the function modules and circuits 160. The program codes accompanied by specific data in a data structure may also be referred to as a processor logic unit or a stack instance when being executed. Therefore, the processor 130 may be regarded as being comprised of a plurality of processor logic units, each for executing one or more specific functions or tasks of the corresponding software module. According to the embodiments of the invention, the processor 130 may perform different operations of a plurality of sub-operating systems (OSs). The sub-OSs may comprise at least one of a trusted execution environment (TEE), a modem (MD), a multimedia (MM), an application processing unit (APU), an ARM trusted firmware (TFA), a sensor-hub control processor (SCP), a graphics processing unit (GPU), a connectivity system (CONSYS), boot random-only memory (BROM), a preloader, and a litter kernel (LK), but the invention should not be limited thereto.

The memory device 140 may store the software and firmware program codes, system data, user data, etc. of the multi-OS log management apparatus 100. The memory device 140 may be a volatile memory such as a Random Access Memory (RAM); a non-volatile memory such as a flash memory or Read-Only Memory (ROM); a hard disk; or any combination thereof. The memory device 140 may comprise a memory buffer 141 which is prepared for the log data from the sub-OSs of the multi-OS log management apparatus 100. In an embodiment, each sub-OS may store its log data in the memory buffer 141 through the UART circuit 150. In another embodiment, each sub-OS may directly store its log data in the memory buffer 141 through a direct memory access (DMA) technology.

The UART circuit 150 may be a UART interface. The UART circuit 150 may comprise at least one UART port and at least one universal serial bus (USB) port. The UART circuit 150 may be configured to store the log data from the sub-OSs in the memory buffer 141. In addition, the UART circuit 150 may be configured to output the log data from the sub-OSs through the UART port or the USB port for debugging the log data. When the UART circuit 150 outputs the log data from the USB port, the UART circuit 150 may disable the UART port to save power.

The function modules and circuits 160 may comprise a log storage module 161, a log output module 162 and a log operator module 163. The processor 130 may execute different modules or circuits in the function modules and circuits 160 to perform embodiments of the present invention. In the embodiment of the invention, the log storage module 161 may store the log from the sub-Oss through the UART circuit 150 or through a DMA technology. The log data output module 162 may determine that the log data from the sub-OSs is output through the UART port or the USB port. The log operator module 163 may process the log data stored in the memory buffer 141.

According to an embodiment of the invention, when the sub-OS performed in an apparatus (e.g., the multi-OS log management apparatus 100) generates the log data, the sub-OS may store its log data in the memory buffer (e.g., memory buffer 141) of the apparatus through a UART circuit (e.g., UART circuit 150) or through a DMA technology. Then, the apparatus may manage the log data store in the memory buffer.

Figure 2:
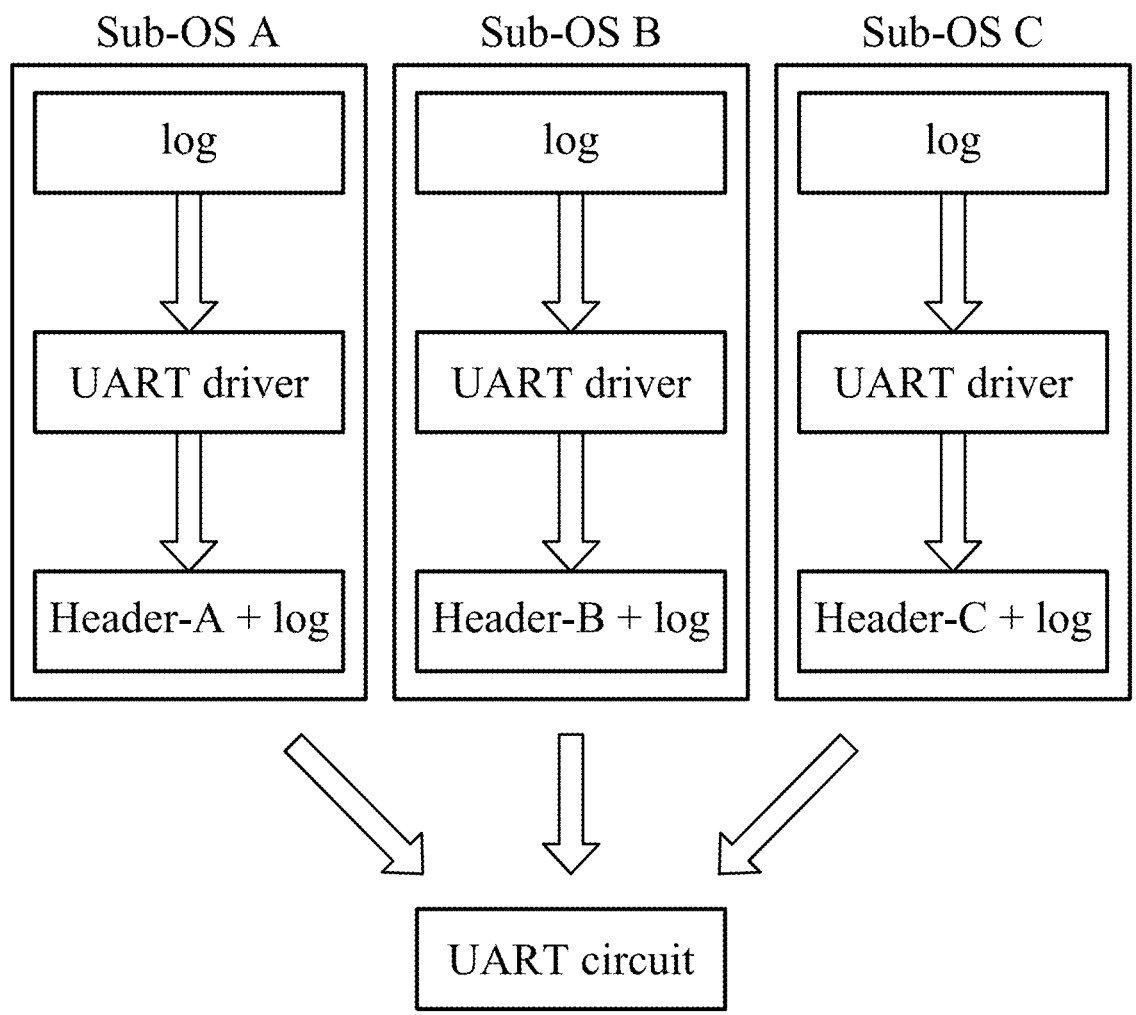
FIG. 2 is a schematic diagram illustrating specific headers of log data from different sub-OSs according to an embodiment of the invention.

According to an embodiment of the invention, each log data of a different sub-OS may comprise a specific header. In an example, each sub-OS may print its log data through the UART mechanism to store its log data in the memory buffer. FIG. 2 is a schematic diagram illustrating specific headers of log data from different sub-OSs according to an embodiment of the invention. As shown in FIG. 2, the sub-OS A may add the specific header Header-A into its log data through its UART driver, and then transmit the log data with Header-A to the UART circuit. The sub-OS B may add the specific header Header-B into its log data through its UART driver, and then transmit the log data with Header-B to the UART circuit. The sub-OS C may add the specific header Header-A into its log data through its UART driver, and then transmit the log data with Header-C to the UART circuit. Different specific headers can be used to identify that the log data is from which sub-OS. Therefore, in the embodiments of the invention, each sub-OS may not be configured a specific memory buffer. The log data from all sub-OSs can be stored in the same memory buffer.

Figure 3:
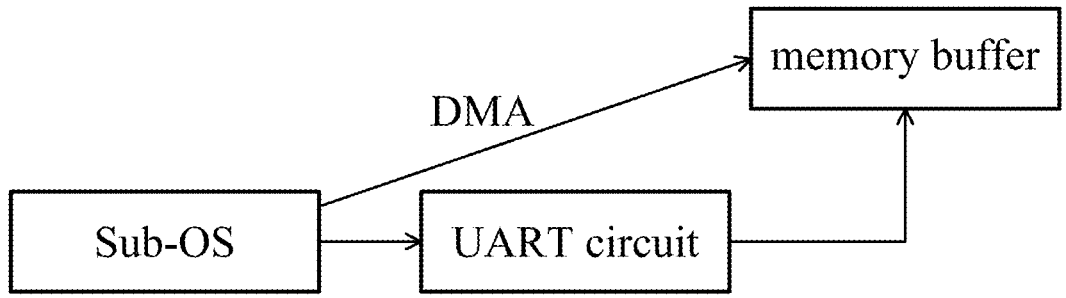
FIG. 3 is a schematic diagram illustrating operations for storing the log data according to an embodiment of the invention.

FIG. 3 is a schematic diagram illustrating operations for storing the log data according to an embodiment of the invention. As shown in FIG. 3, in an operation of the invention, the sub-OS may store its log data in the memory buffer through the UART circuit. In addition, in the operation, the UART circuit may encrypt the log data from the sub-OSs, before storing the log data in the memory buffer. As shown in FIG. 3, in another operation, the sub-OS may directly store its log data in the memory buffer through the DMA technology.

Figure 4:
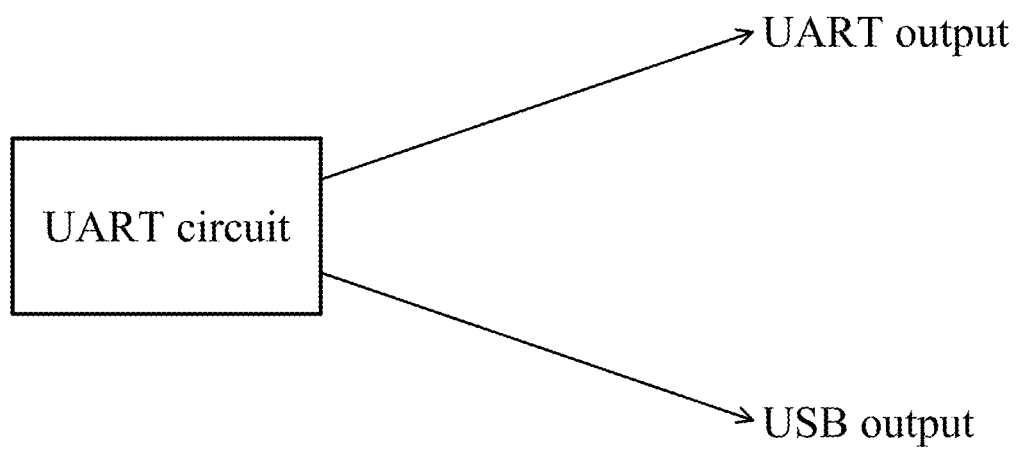
FIG. 4 is a schematic diagram illustrating outputting the log data according to an embodiment of the invention.

FIG. 4 is a schematic diagram illustrating outputting the log data according to an embodiment of the invention. As shown in FIG. 4, the UART circuit may output the log data from the sub-OS through its UART port for debug. In addition, the UART circuit may also output the log data from the sub-OS through its USB port for debug. That is, when a debug device is used to debug the log data, the debug device may obtain the log data from the UART port or the USB port of the UART circuit. In addition, when the UART circuit outputs the log data from the USB port, the UART circuit may disable the UART port to save power.

Figure 5:
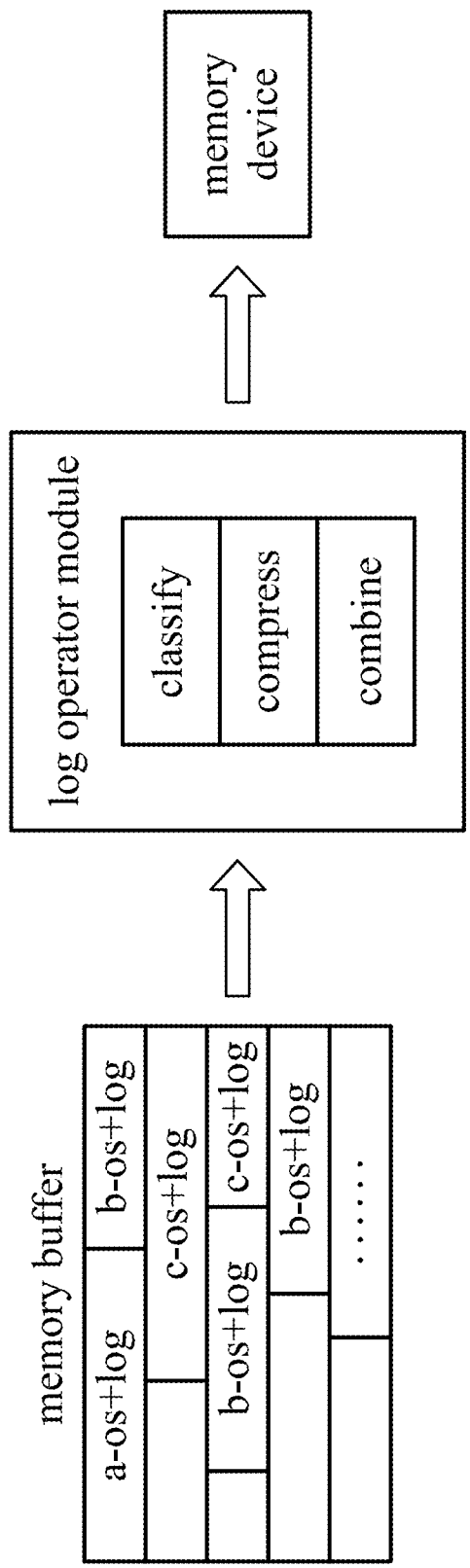
FIG. 5 is a schematic diagram illustrating the operations of processing the log data according to an embodiment of the invention.

FIG. 5 is a schematic diagram illustrating the operations of processing the log data according to an embodiment of the invention. As shown in FIG. 5, the log operator module of the apparatus may be used to process the log data stored in the memory buffer. FIG. 5 is only used to illustrate the examples of processing the log data stored in the memory buffer, but the invention should not be limited thereto. Other operations of processing the log data also can be applied.

As shown in FIG. 5, in an example, the log operator module may be configured to classify (or sort) the log data according to the timestamps of the log data to synchronize the log data. The timestamps may be based on the Real-time clock (RTC) of the apparatus. In addition the log operator module may be configured to store the classified data into the memory device of the apparatus for later analysis.

As shown in FIG. 5, in another example, the log operator module may be also configured to classify the log data according to different events corresponding to the log data. For example, when an event is associated with sub-OS A and sub-OS B, the log operator module may classify the data log of sub-OS A (i.e., a-os+log) and the data log of sub-OS B (i.e., b-os+log) in the same group. In addition the log operator module may be configured to store the classified data into the memory device of the apparatus for later analysis.

As shown in FIG. 5, in another example, the log operator module may be further configured to combine the log data corresponding to the same event. In addition the log operator module may be configured to store the combined log data into the memory device of the apparatus for later analysis.

As shown in FIG. 5, in another example, the log operator module may be also configured to compress or encrypt the log data. In addition the log operator module may be configured to store the compressed log data or the encrypted log data into the memory device of the apparatus for later analysis.

Figure 6:
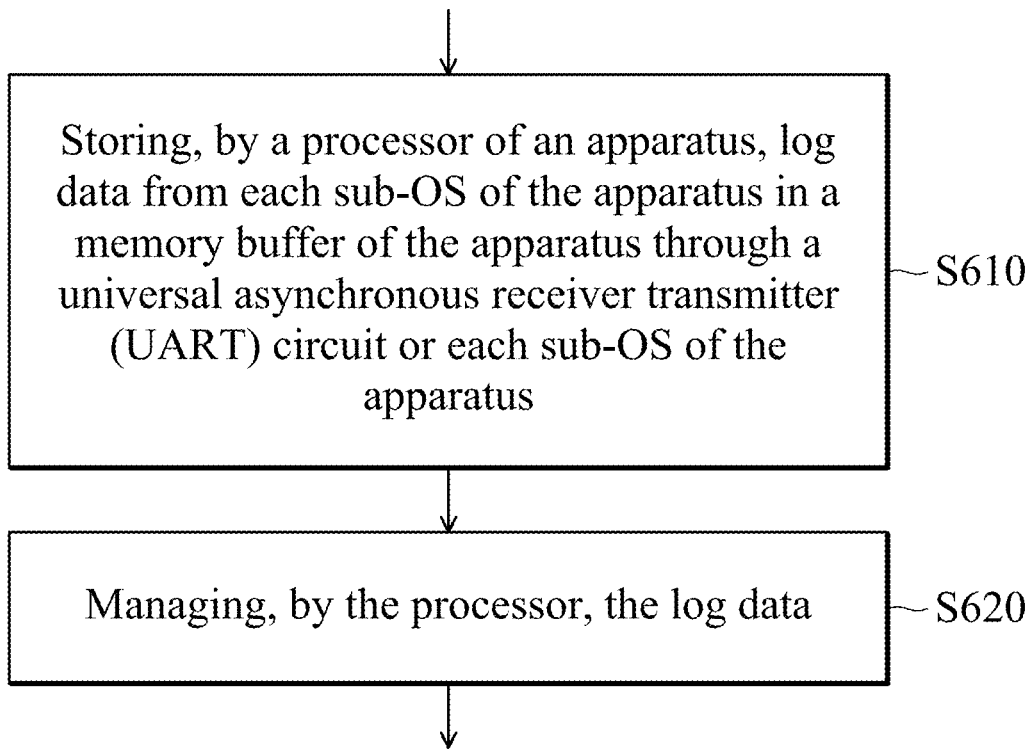
FIG. 6 is a flow chart illustrating a multi-OS log management method according to an embodiment of the invention.

FIG. 6 is a flow chart illustrating a multi-OS log management method according to an embodiment of the invention. The method can be applied to the multi-OS log management apparatus 100. As shown in FIG. 6, in step S610, a processor of the multi-OS log management apparatus 100 may store the log data from each sub-OS of the multi-OS log management apparatus 100 in a memory buffer of the multi-OS log management apparatus 100 through a UART circuit or each sub-OS of the multi-OS log management apparatus 100.

In step S620, the processor of the multi-OS log management apparatus 100 may manage the log data.

According to an embodiment of the invention, in the multi-OS log management method, each log data of a different sub-OS may comprise a specific header.

According to an embodiment of the invention, in the multi-OS log management method, the processor of the multi-OS log management apparatus 100 may use a DMA technology to store the log data from each sub-OS in the memory buffer.

According to an embodiment of the invention, in the multi-OS log management method, the UART circuit may encrypt the log data before the log data is stored in the memory buffer.

According to an embodiment of the invention, in the multi-OS log management method, the UART circuit may output the log data through a UART port.

According to an embodiment of the invention, in the multi-OS log management method, the UART circuit may output the log data through a USB port.

According to an embodiment of the invention, in the multi-OS log management method, the processor of the multi-OS log management apparatus 100 may classify the log data according to timestamps of the log data, and store the classified log data into a memory of the multi-OS log management apparatus 100.

According to an embodiment of the invention, in the multi-OS log management method, the processor of the multi-OS log management apparatus 100 may classify the log data according to events corresponding to the log data, and store the classified log data into a memory of the multi-OS log management apparatus 100.

According to an embodiment of the invention, in the multi-OS log management method, the processor of the multi-OS log management apparatus 100 may combine the log data corresponding to the same event, and store the combined log data into a memory of the multi-OS log management apparatus 100.

According to an embodiment of the invention, in the multi-OS log management method, the processor of the multi-OS log management apparatus 100 may compress the log data, and store the compressed log data into a memory of the multi-OS log management apparatus 100.

According to the multi-OS log management method provided in the embodiments of the invention, the log data from all sub-OSs can be stored in the same memory buffer through a UART circuit, and the log data stored in the memory buffer can be managed only through a driver (e.g., log operator module 163). Therefore, in the multi-OS log management method provided in the embodiments of the invention, each sub-OS will not need to store its log data to different memory buffers respectively. In addition, in the multi-OS log management method provided in the embodiments of the invention, each sub-OS will not need to process its log data through different drivers in the kernel respectively. Therefore, the complexity of managing and maintaining the log data from different sub-OSs can be reduced.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in the UE. In the alternative, the processor and the storage medium may reside as discrete components in the UE. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A multi-operating system (OS) log management method, comprising:
    adding, by each sub-OS of an apparatus, a specific header to a log data through a universal asynchronous receiver transmitter (UART) driver of each sub-OS, wherein the specific header corresponding to each sub-OS is different;
    storing, by a processor of the apparatus, log data with the specific header from each sub-OS in a memory buffer of the apparatus through a UART circuit or each sub-OS of the apparatus; and
    managing, by the processor, the log data from each sub-OS.

2. The multi-OS log management method of claim 1, wherein each log data of a different sub-OS comprises a specific header.

3. The multi-OS log management method of claim 1, wherein the storing the log data in the memory buffer through each sub-OS comprises:
    using, by the processor, a direct memory access (DMA) technology to store the log data from each sub-OS in the memory buffer.

4. The multi-OS log management method of claim 1, wherein the storing the log data in the memory buffer through the UART circuit comprises:
    encrypting, by the UART circuit, the log data before the log data is stored in the memory buffer.

5. The multi-OS log management method of claim 1, wherein the managing the log data comprises:
    outputting, by the UART circuit, the log data through a UART port.

6. The multi-OS log management method of claim 1, wherein the managing the log data comprises:
    outputting, by the UART circuit, the log data through a universal serial bus (USB) port.

7. The multi-OS log management method of claim 1, wherein the managing the log data comprises:
    classifying, by the processor, the log data according to timestamps of the log data; and
    storing, by the processor, the classified log data into a memory of the apparatus.

8. The multi-OS log management method of claim 1, wherein the managing the log data comprises:
    classifying, by the processor, the log data according to events corresponding to the log data; and
    storing, by the processor, the classified log data into a memory of the apparatus.

9. The multi-OS log management method of claim 1, wherein the managing the log data comprises:
    combining, by the processor, the log data corresponding to the same event; and
    storing, by the processor, the combined log data into a memory of the apparatus.

10. The multi-OS log management method of claim 1, wherein the managing the log data comprises:
    compressing, by the processor, the log data; and
    storing, by the processor, the compressed log data into a memory of the apparatus.

11. A user equipment (UE) for multi-operating system (OS) log management, comprising:
    a universal asynchronous receiver transmitter (UART) circuit;
    a memory, comprising a memory buffer for log data;
    a processor, coupled to the UART circuit and the memory, and performing a plurality of sub-operating systems (OSs),
    wherein during operation, the processor performs operations comprising:
        adding a specific header to a log data through a UART driver of each sub-OS, wherein the specific header corresponding to each sub-OS is different;
        storing log data with the specific header from each sub-OS in the memory buffer through the UART circuit or each sub-OS of the apparatus; and
        managing the log data from each sub-OS.

12. The UE of claim 11, wherein each log data of a different sub-OS comprises a specific header.

13. The UE of claim 11, wherein during operation, the processor performs operations comprising:
    using a direct memory access (DMA) technology to store the log data from each sub-OS in the memory buffer.

14. The UE of claim 11, wherein during operation, the processor performs operations comprising:

encrypting, via the UART circuit, the log data before the log data is stored in the memory buffer.

15. The UE of claim 11, wherein during operation, the processor performs operations comprising:
outputting, via the UART circuit, the log data through a UART port.

16. The UE of claim 11, wherein during operation, the processor performs operations comprising:
outputting, via the UART circuit, the log data through a universal serial bus (USB) port.

17. The UE of claim 11, wherein during operation, the processor performs operations comprising:
classifying the log data according to timestamps of the log data; and
storing the classified log data into the memory.

18. The UE of claim 11, wherein during operation, the processor performs operations comprising:
classifying the log data according to events corresponding to the log data; and
storing the classified log data into the memory.

19. The UE of claim 11, wherein during operation, the processor performs operations comprising:
combining the log data corresponding to the same event; and
storing the combined log data into the memory.

20. The UE of claim 11, wherein during operation, the processor performs operations comprising:
compressing the log data; and
storing the compressed log data into the memory.

* * * * *